United States Patent [19]

Litzenburger

[11] Patent Number: 4,636,311
[45] Date of Patent: Jan. 13, 1987

[54] MULTIPLE FILTERS WITH FLOW-REVERSING ROTARY VALVE SET

[76] Inventor: Wolfgang Litzenburger, Barbarossastr. 1, D-6733 Hassloch/Pfalz, Fed. Rep. of Germany

[21] Appl. No.: 435,673

[22] Filed: Oct. 21, 1982

[30] Foreign Application Priority Data

Oct. 22, 1981 [DE] Fed. Rep. of Germany ....... 3141900

[51] Int. Cl.$^4$ ............................................. B01D 29/26
[52] U.S. Cl. ................................. 210/323.2; 210/333.1
[58] Field of Search ...................... 210/107, 108, 323.2, 210/333.1, 333.01, 341, 425, 426, 427, 421

[56] References Cited

U.S. PATENT DOCUMENTS 3,380,591 4/1968 Muller ......................... 210/331.1 X
4,059,518 11/1977 Rishel ............................. 210/107 X

FOREIGN PATENT DOCUMENTS 1039995 10/1958 Fed. Rep. of Germany ... 210/333.1
1486812 3/1970 Fed. Rep. of Germany ... 210/333.1
2658363 6/1978 Fed. Rep. of Germany ......................... 210/333.01

Primary Examiner—David Sadowski
Attorney, Agent, or Firm—Walter C. Farley

[57] ABSTRACT

A filter has circularly arranged filter elements open on both ends mounted between two separation plates in a filter housing. The plates separate the raw liquid inlet end from a clean liquid discharge section and separate both of these from an outlet end for the dirty liquid. Both ends of each filter element are connected through passages in the separation plates with the inlet and outlet ends. Rotary valves are connected nonrotatably with each other to open and close the connections between the filter elements and the inlet and outlet spaces. Only one rotary slide valve is provided on each side of the separation plates facing away from each other. The rotary slide valve on the admission side covers fewer passages than the rotary slide valve on the opposite side. The total number of passages covered by the rotary slide valves is the same as the total number of filter elements.

5 Claims, 4 Drawing Figures

MULTIPLE FILTERS WITH FLOW-REVERSING ROTARY VALVE SET

This invention relates to a filter of the type having a plurality of filter elements and means for controlling the flow through the individual elements.

BACKGROUND OF THE INVENTION

Broadly speaking, it is known to provide a filter having a plurality of elements with some arrangement for the purpose of reversing flow selectively through the elements so as to clean the elements, at least partially, and so as to remove the material filtered out of a liquid medium passing therethrough.

In one known filter of this general type, shown in German Auslegeschrift No. 1,029,995, the filter elements are in the general configuration of a battery and the separation device consists of separate rotary valves associated with each end of each filter element, the valves being connected nonrotatably with each other by means of a shaft which is coaxial with the filter element, the valves being driven by means of a control device of the sort that is opened when one of the rotary valves at the other end is closed. Such a configuration is expensive and complicated because of the plurality of rotary valves and the reversing devices associated with each pair of such valves.

With another known reversible flow filter, shown in German Patent No. 14 86 812, the filter elements are arranged in a circle. The separation device has passage openings in the separation plates connected with the filter element being covered or freed and rotary valves connected nonrotatably with each other. The rotary valves work together on any one of the filter elements and are hollow, which leads to a complicated structure.

BRIEF DESCRIPTION OF THE INVENTION

An object of the present invention is to provide a reversible flow filter in which the rotary slide valves do not require hollow construction or interior free space.

A further object is to provide such a structure which is simple and easy to manufacture, and which is reliable in its operation.

Briefly described, the invention includes, a filter of the type having a housing, first and second spaced separation plates dividing the housing into an inlet end with an opening to receive liquid to be filtered, a filter section between the plates and an outlet end which receives dirty liquid, a plurality of openings in each separation plate, and a plurality of hollow, generally tubular filter elements extending between the plates and aligned with the openings therethrough, the improvement comprising first and second rotary valve members associated respectively with the first and second separator plates, said first valve member being at said inlet end, means for interconnecting said first and second valve members together for rotation with each other, said first and second valve members being selectively rotatable to any one of a plurality of positions in each of which said first valve member closes a predetermined number N of openings in said first plate to which inlet ends of N of said filter elements are connected and at the same time said second valve member closes a predetermined number M of openings in said second plate to which the other ends of M of said filter elements are connected, wherein N is less than M and wherein the sum N+M equals the total number of filter elements.

As will be seen by the following description, it is possible by means of the apparatus disclosed herein to use solid rotary valve members which are easily manufactured and are not susceptible to damage during operation. It is advantageous that the rotary valve on the inlet side covers only one single passage and the rotary valve on the outlet side covers all passages connected with the filter elements except for that one covered by the admission side valve.

By controlling the discharge, as will be described, great simplification of the structural form of the rotary valve on the outlet side is possible because, with that arrangement, the valve for the dirty liquid on the outlet side no longer must produce a seal but need only produce high flow resistance.

In order that the manner in which the foregoing and other objects are attained in accordance with the invention can be understood in detail, a particularly advantageous embodiment thereof will be described with reference to the accompanying drawings, which form a part of this specification, and wherein.

Figure 1:
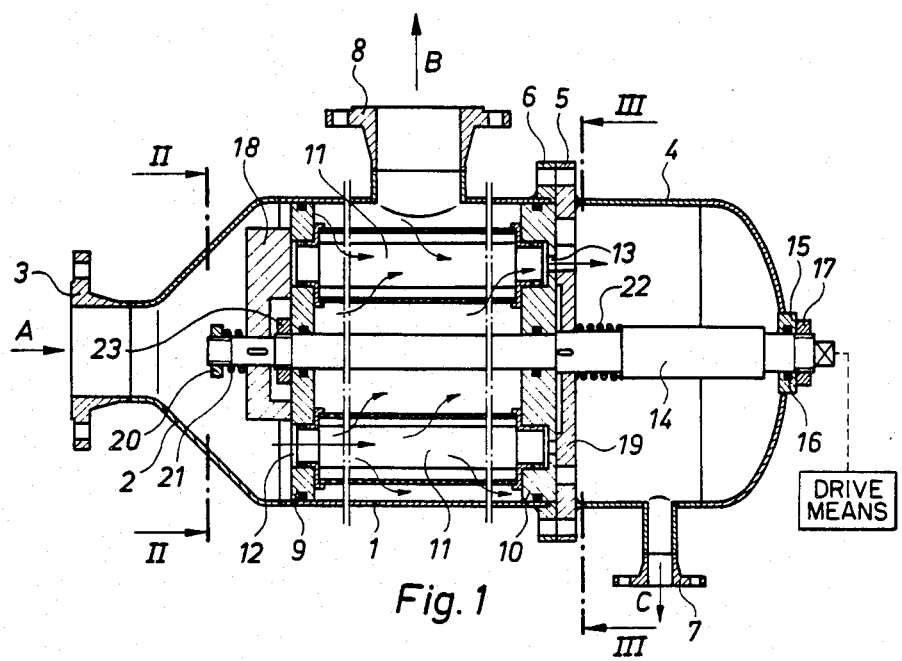
FIG. 1 is a longitudinal side elevation, in section, of a filter apparatus in accordance with the present invention.

As will be seen in the drawings, the reversible flow filter of FIG. 1 includes an essentially cylindrical housing 1, one end of which tapers to a smaller diameter inlet coupling 3 which is coaxial with housing 1 and which can be connected to a conduit for the admission of raw liquid to be filtered. At the other end of housing 1 from coupling 3 is a dome-like cover 4 which has an annular flange 5 welded to the open end thereof and which can be connected by screws, not shown, to an annular flange 6 which is welded on to the end of housing 1. Cover 4 has a connection 7 at the lower portion of the cylindrical part thereof for the discharge of dirty liquid. Approximately in the middle of the cylindrical part of housing 1 there is a connection 8 for the discharge of clean, filtered liquid.

Within housing 1 are two separation plates 9 and 10 which are tightly inserted therein and which are retained and sealed by means of gaskets. Between separation plates 9 and 10 are a plurality of circularly arranged elongated filter elements 11, each filter element being in the shape of a hollow cylinder and having reduced diameter portions at opposite ends thereof, the smaller ends being inserted tightly into openings in separation plates 9 and 10. Each of the separation plates has a number of passages 12 and 13 which are uniformly spaced apart in concentric circles and which correspond in number to the number of filter elements.

A shaft 14 extends axially through the centers of separation plates 9 and 10 and projects through cover 4 and can be connected to drive means at that location. Shaft 14 is rotatably mounted in a bearing ring 15 attached to cover 4. The clearance between shaft 14 and the bearing ring 15 is packed by a gasket. A nut 17 is screwed onto the stub of shaft 14 projecting outwardly beyond bearing ring 15.

Solid rotary valves 18 and 19 are nonrotatably attached to shaft 14 on those sides of plates 9 and 10 which face away from each other. A compression coil spring 21 is inserted between a nut 20 screwed onto the end of shaft 14 and rotary valve 18 in the vicinity of valve 18, the function of the spring being to urge the rotary valve against its cooperating surface of a plate 9. A spring 22 is similarly inserted between a collar on shaft 14 and rotary valve 19 to urge valve 19 against plate 10.

Rotary valve 18 is configured so that, at any of its operative positions, it covers only one of passages 12 in separation plate 9 and leaves the other openings free. In that position, fluid can flow through plate 9 into the other filter elements from the inlet chamber adjacent coupling 3. This position is shown most clearly in FIG. 2. As seen in FIG. 3, the disc shaped rotary valve 19, on the other hand, covers all of the passages 13 in plate 10 with the exception of the passage associated with that filter element, the other end of which is being covered by valve 18. It is also possible to construct and arrange rotary valve 18 so that it covers more than one passage 12, in which case rotary valve 19 is arranged so that it covers correspondingly fewer passages 13. The total of passages 12 covered by valve 18 and passages 13 covered by valve 19 is equal to the number of filter elements 11.

Figure 2:
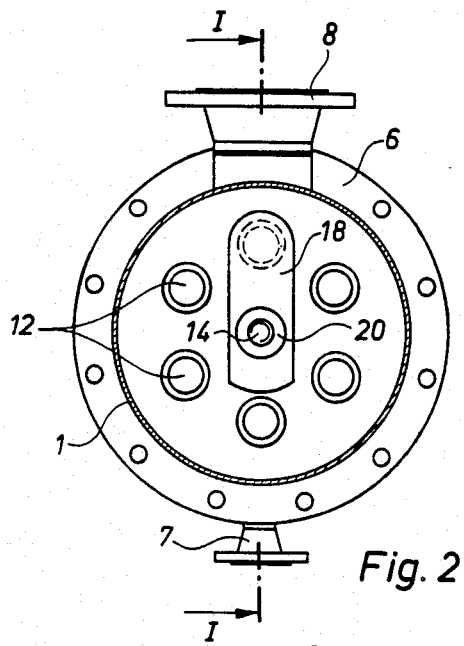
FIG. 2 is a transverse sectional view along line II—II of FIG. 1.
Figure 3:
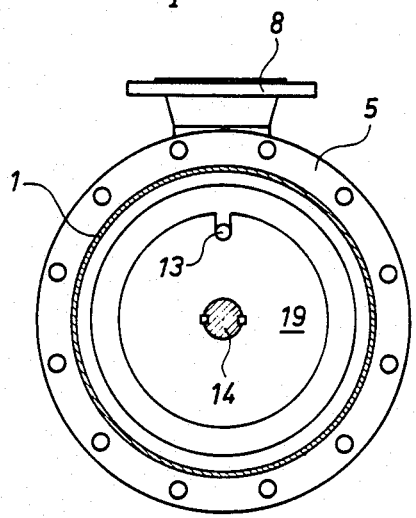
FIG. 3 is a transverse sectional view along line III—III of FIG. 1.

As will be seen from FIGS. 1 and 2, rotary valve 18 has a solid face covering the openings in plate 9 and a protrusion at its other end which rides against the plate radially inwardly of the openings. Thus, from the side it appears to be essentially U-shaped. It surrounds a nut 23 screwed on to shaft 14 which holds separation plates 9 and 10 and the filter elements 11 there between together, cooperating with a collar on the side of plate 10 facing away from plate 9, and a nut 17 which holds this unit on the part of flange 5 which projects inwardly.

During the operation of the filter, raw liquid is carried in through connection 3 in the direction of arrow A and flows through those filter elements which are not covered by rotary valve 18, the direction of flow through each of those filter elements being from the inside out, causing removal of dirt particles from the liquid as it passes from the inside to the outside of each element. Most of the clean liquid emerging from those filter elements 11 is carried off through the clean liquid connection 8 in the direction of arrow B.

In the case of the one filter element 11 of which the inlet passage 12 in plate 9 is covered exactly by rotary valve 18, however, clean liquid flows from the outside to the inside, the reverse of all of the others, and deposited impurities are removed from the inside of this filter element by this flow and are carried through the open passage 13 which is left open by rortary valve 19 into the chamber within cover 4. The dirty liquid is then discharged through connection 7 in the direction of arrow C. After rotary valves 18, 19 are rotated so that passage 12 of another filter element 11 is covered by rotary valve 18 and the relevant passage 13 in plate 10 is freed by valve 19, another filter element is similarly cleaned.

Plates 9, 10, filter elements 11, shaft 14 and valves 18, 19 are configured so that when cover 4 of the structure is removed from housing 1, the interior elements can be easily replaced.

Figure 4:
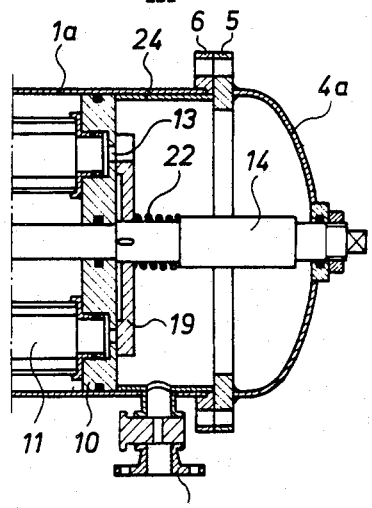
FIG. 4 is a partial side elevation, in section, of a modified form of the apparatus of FIG. 1.

As shown in FIG. 4, a valve element can be provided in connection 7 for selectively opening that connection to discharge the dirty liquid only when desired. This provides a great simplification of the structure, particularly of rotary valve 19. With this provision, the passages covered by valve 19 no longer need to be covered tightly since a high flowthrough resistance suffices.

If connection 7 for discharge of dirty liquid from the chamber defined by cover 4 cannot be separated from the piping mounted thereon, with the structure shown in FIG. 4 it is possible to extend housing 1A in the direction of cover 4A and to place an intermediate ring 24 between flange 5 and separation plate 10. The option then exists to include connection 7 for the dirty liquid with housing 1A.

While certain advantageous embodiments have been disclosed, it will be recognized by those skilled in the art that various changes and modifications can made therein without departing from the scope of the invention as defined in the appended claims.

What is claimed:

1. In a filter of the type having a housing, first and second spaced separation plates dividing the housing into an inlet end with an opening to receive liquid to be filtered, a filter section between the plates and an outlet end which receives dirty liquid, a plurality of openings in each separation plate, and a plurality of hollow, generally tubular filter elements extending between the plates and aligned with the openings therethrough, the improvement comprising
   first and second rotary slide valve members associated respectively with the first and second separator plates, said first valve member being a solid member located at said inlet end,
   means for interconnecting said first and second valve members together for rotation with each other;
   means for selectively rotating said first and second valve members to any one of a plurality of positions in each of which said first valve member closes a predetermined number N of openings in said first plate to which inlet ends of N of said filter elements are connected and at the same time said second valve member closes a predetermined number M of openings in said second plate to which the other ends of M of said filter elements are connected, wherein N is less than M and wherein the sum N+M equals the total number of filter elements.

2. A filter according to claim 1 wherein said outlet end includes means for discharging dirty liquid and a valve member for selectively opening and closing said means for discharging.

3. A filter according to claim 1 wherein said means for interconnecting said valve members includes a drive shaft which extends through said housing from said inlet end to said outlet end and out of said housing at said outlet end.

4. A filter according to claim 3 wherein said first valve member comprises a generally U-shaped member having one end dimensioned to cover and close said predetermined number N of openings in said first plate, the other end of said U-shaped member being positioned to ride against said first plate radially offset from said openings, said drive shaft being nonrotatably attached to said member intermediate said ends.

5. A filter according to claim 4 wherein said second valve member comprises a rotatable plate dimensioned to cover and close M of said openings in said second plate in any of a plurality of positins, said rotatable plate being nonrotatably attached to said drive shaft.

* * * * *